US007400306B2

(12) United States Patent
Hu

(10) Patent No.: US 7,400,306 B2
(45) Date of Patent: Jul. 15, 2008

(54) DRIVING METHOD FOR DUAL PANEL DISPLAY

(75) Inventor: Shuo-Hsiu Hu, Hsinchu (TW)

(73) Assignee: AU Optronics Corp., Hsin-Chu (TW)

(*) Notice: Subject to any disclaimer, the term of this patent is extended or adjusted under 35 U.S.C. 154(b) by 826 days.

(21) Appl. No.: 10/857,860

(22) Filed: Jun. 2, 2004

(65) Prior Publication Data

US 2006/0007195 A1 Jan. 12, 2006

(51) Int. Cl.
*G09G 5/00* (2006.01)
*G09G 3/36* (2006.01)
*H04N 7/14* (2006.01)
*H04B 1/38* (2006.01)

(52) U.S. Cl. .......................... 345/1.3; 345/98; 345/100; 345/103; 345/690; 348/14.07; 348/52; 348/383; 349/144; 349/152; 455/566

(58) Field of Classification Search ................. 345/1.3, 345/82, 83, 90, 92, 98–100, 103; 349/144, 349/149–152; 348/14.07, 52, 383; 455/566
See application file for complete search history.

(56) References Cited

U.S. PATENT DOCUMENTS 5,748,165 A * 5/1998 Kubota et al. ................. 345/96
6,466,292 B1 * 10/2002 Kim ........................... 349/143
6,954,184 B2 * 10/2005 Kurashima et al. ........... 345/1.3
7,215,313 B2 5/2007 Giraldo et al.
7,268,746 B2 * 9/2007 Yoshida ...................... 345/1.1
7,301,509 B2 * 11/2007 Yun et al. .................... 345/1.3
7,330,163 B2 * 2/2008 Nakai et al. .................. 345/1.1
7,336,252 B2 * 2/2008 Tsuyuki et al. ............... 345/96

FOREIGN PATENT DOCUMENTS

WO WO 03077231 9/2003

OTHER PUBLICATIONS

CN Office Action mailed Mar. 9, 2007.

* cited by examiner

*Primary Examiner*—Henry N Tran
(74) *Attorney, Agent, or Firm*—Thomas, Kayden, Horstemeyer & Risley

(57) ABSTRACT

A flat panel display device for dual-panel display that comprises an array of pixels formed in rows and columns, a first sub-array of the array of pixels for image display in a first direction, a second sub-array of the array of pixels for image display in a second direction, at least one scan driver for sequentially scanning the array of pixels row by row, and a plurality of multiplexers, connectable to receive a control signal having a first state and a second state, for connecting the first sub-array of pixels to the at least one scan driver in response to the first state of the control signal, and connecting the second sub-array of pixels to the at least one scan driver in response to the second state of the control signal.

28 Claims, 3 Drawing Sheets

DRIVING METHOD FOR DUAL PANEL DISPLAY

FIELD OF THE INVENTION

The invention relates in general to a flat panel display ("FPD") device and, more particularly, to a circuit and method for driving an FPD device.

BACKGROUND OF THE INVENTION

Flat panel display ("FPD") devices such as liquid crystal display ("LCD") devices or organic electroluminescence devices generally comprise scan drivers and data drivers for driving a panel through scan lines and data lines, respectively. Each of the scan lines connects a pin of a scan driver to a pixel of the panel. The number of the scan lines equals that of the pins of the scan drivers. Likewise, each of the data lines connects a pin of a data driver to a pixel of the panel, and the number of the data lines equals that of the pins of the data drivers.

Conventional FPD devices are designed with a dual-display or double-display panel, which comprises a main panel and a sub-panel. Generally, the main panel serves to provide main display functions of an electronic product, and the sub-panel serves to provide subsidiary display functions such as a caller identity display or a clock display. The main panel and the sub-panel are generally independent of each other, and comprise individual driving circuits. As a result, a dual-panel FPD device must have double the number of scan lines of a single-panel FPD device. Given a resolution of 128×160, a single-panel FPD device has 160 scan lines supported by a scan driver having 160 pins, and a double-panel FPD device will have 320 scan lines which are supported by two such scan drivers or a 320-pin scan driver, disadvantageously resulting in an undesirable increase in device size. It is thus desirable to have an FPD device that provides a dual display function without increasing the pins or scan drivers used for a single-panel FPD device.

SUMMARY OF THE INVENTION

To achieve these and other advantages, and in accordance with the purpose of the invention as embodied and broadly described, there is provided a flat panel display device for dual-panel display that comprises a first sub-array of pixels for image display in a first direction, a second sub-array of pixels for image display in a second direction, the first sub-array of pixels and the second sub-array of pixels define an array of pixels, at least one scan driver for sequentially scanning the array of pixels, and a plurality of multiplexers, connectable to receive a control signal having a first state and a second state, for connecting the first sub-array of pixels to the scan driver in response to the first state of the control signal, and connecting the second sub-array of pixels to the scan driver in response to the second state of the control signal.

Also in accordance with the present invention, there is provided a flat panel display device for dual-panel display that comprises a first sub-array of pixels for image display in a first direction, a second sub-array of pixels for image display in a second direction, first sub-array of pixels and the second sub-array of pixels define an array of pixels, a scan driver comprising a plurality of pins for providing scan signals to the array of pixels, a plurality of multiplexers, connectable to receive a control signal having a first state and a second state, corresponding to the pins of the scan driver, the multiplexers connecting a row of the first sub-array of pixels to one of the pins in response to the first state of the control signal, and connecting a row of the second sub-array of pixels to one of the pins of the scan driver in response to the second state of the control signal.

Still in accordance with the present invention, there is provided a method of operating a flat panel display device for dual-panel display that comprises forming an array of pixels in rows and columns, defining a first sub-array of pixels of the array of pixels for image display in a first direction, defining a second sub-array of pixels of the array of pixels for image display in a second direction, scanning the array of pixels row by row with at least one scan driver, providing a control signal having a first state and a second state, connecting the first sub-array of pixels to the scan driver in response to the first state of the control signal, and connecting the second sub-array of pixels to the scan driver in response to the second state of the control signal.

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present embodiment of the invention, an example of which is illustrated in the accompanying drawings. Wherever possible, the same reference numbers will be used throughout the drawings referring to the same or like parts.

Figure 1:
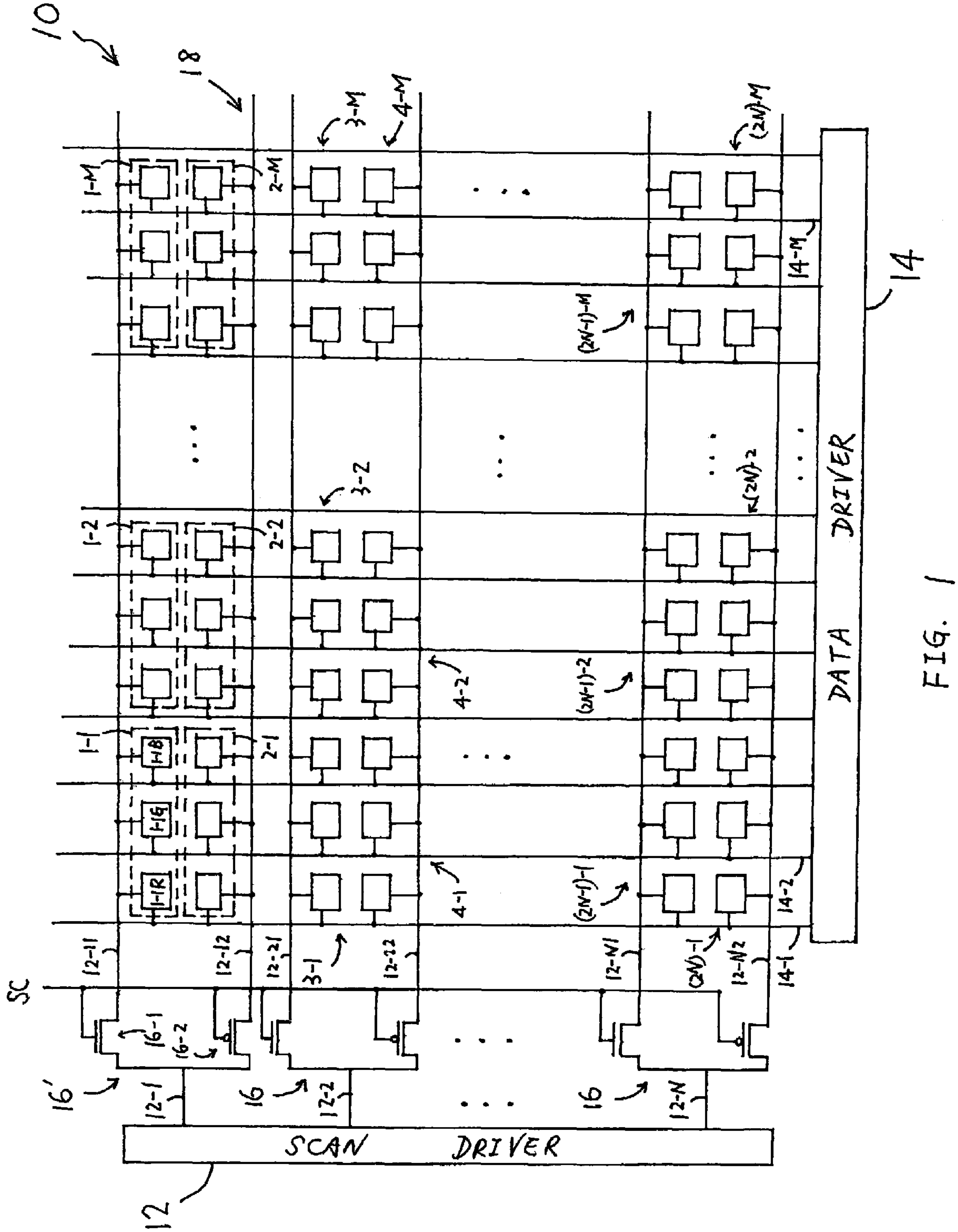
FIG. 1 is a schematic circuit diagram of a flat panel display ("FPD") device in accordance with an embodiment of the present invention.

FIG. 1 is a schematic circuit diagram of a flat panel display ("FPD") device 10 in accordance with an embodiment of the present invention. FPD 10, providing a dual display function, comprises a scan driver 12, a data driver 14, a plurality of multiplexers 16 and an array of pixels 18. Scan driver 12 provides scan signals to sequentially select pixels 18 row by row through a plurality of scan lines 12-1, 12-2 . . . and 12-N, N being an integer. Each of scan lines 12-1, 12-2 . . . and 12-N corresponds to a pin of scan driver 12. Data driver 14 provides data signals to the selected pixels through a plurality of data lines 14-1, 14-2 . . . and 14-M, M being an integer. To support dual display, the array of pixels 18 comprises a first sub-array of pixels having odd-numbered rows of pixels 1-1, 1-2 to 1-M, 3-1, 3-2 to 3-M . . . and (2N−1)-1, (2N−1)-2 to (2N−1)-M for image display in a first direction, and a second sub-array of pixels having even-numbered rows of pixels 2-1, 2-2 to 2-M, 4-1, 4-2 to 4-M . . . and (2N)-1, (2N)-2 to (2N)-M for image display in a second direction. Thus, consistent with an embodiment of the present invention, the first sub-array of pixels comprises odd-numbered rows of pixels in the array of pixels 18, and the second sub-array of pixels comprises even-numbered rows of pixels in array of pixels 18. In an aspect, two adjacent rows of pixels corresponding to a same scan line are respectively included in the first sub-array of pixels and the second sub-array of pixels. In another aspect, the first direction is substantially opposite to the second direction.

Each pixel of the first sub-array of pixels, for example, pixel 1-1, includes sub-pixels 1-IR, 1-1G and 1-1B for display in colors red, green and blue, respectively. In an embodiment according to the invention, FPD device 10 comprises a liquid crystal display device, and each of sub-pixels 1-1 R, 1-1 G and 1-1 B comprises a thin film transistor ("TFT", not numbered) to serve as a switching transistor, and a storage capacitor (not numbered). In another embodiment, FPD device 10 comprises an organic electroluminescence display device, and each of sub-pixels 1-IR, 1-1G and 1-1B comprises TFTs to serve as a switching transistor, a driving transistor (not numbered), a light emitting diode (not numbered) and a storage capacitor (not numbered).

Each of the multiplexers 16 corresponds to one of scan lines 12-1, 12-2 . . . and 12-N. An exemplary multiplexer 16' comprises a first transistor 16-I and a second transistor 16-2. The first transistor 16-1 such as an n-type metal oxide semiconductor ("NMOS") transistor includes a gate (not numbered) coupled to a control signal SC, a first electrode (not numbered) coupled to a corresponding scan line 12-I, and a second electrode (not numbered) coupled through a connection line 12-11 to gates of the switching transistors of a row of pixels of the first sub-array of pixels. The second transistor 16-2 such as a p-type metal oxide semiconductor ("PMOS") transistor includes a gate (not numbered) coupled to the control signal SC, a first electrode (not numbered) coupled to a corresponding scan line 12-1, and a second electrode (not numbered) coupled through a connection line 12-12 to gates of the switching transistors (not numbered) of a row of pixels of the second sub-array of pixels. Data signals are provided from data driver 14 to electrodes of the switching transistors of a corresponding column of pixels through data lines 14-I, 14-2 . . . and 14-M.

Figure 2:
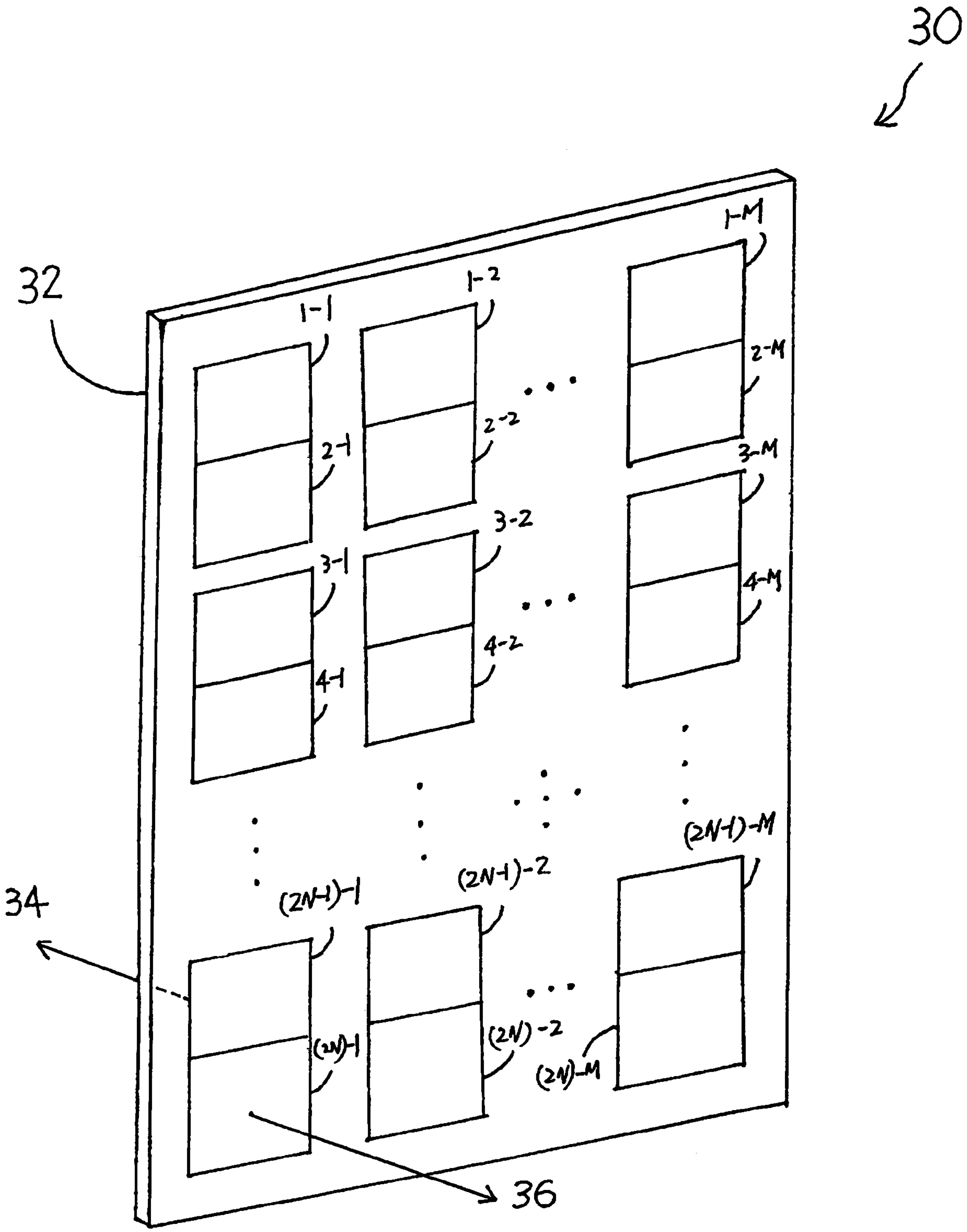
FIG. 2 is a diagram of a dual-panel of an FPD device in accordance with an embodiment of the present invention.

FIG. 2 is a diagram of a dual-display panel 32 of an FPD device 30 in accordance with an embodiment of the present invention. The dual-display panel 32 comprises a first panel (not numbered) comprising a first sub-array of pixels 1-1, 1-2 to 1-M, 3-1, 3-2 to 3-M . . . and (2N−1)-1, (2N−1)-2 to (2N-1)-M for image display in a first direction indicated by an arrow 34, and a second panel (not numbered) comprising a second sub-array of pixels 2-1, 2-2 to 2-M, 4-1, 4-2 to 4-M . . . and (2N)-1, (2N)-2 to (2N)-M for image display in, a second direction indicated by an arrow 36. In an aspect, dual-display panel 32 comprises a single panel substrate comprising the first and the second panels. In another aspect, dual panel 32 comprises separate panel substrates for the first and the second panels, respectively.

Figure 3:
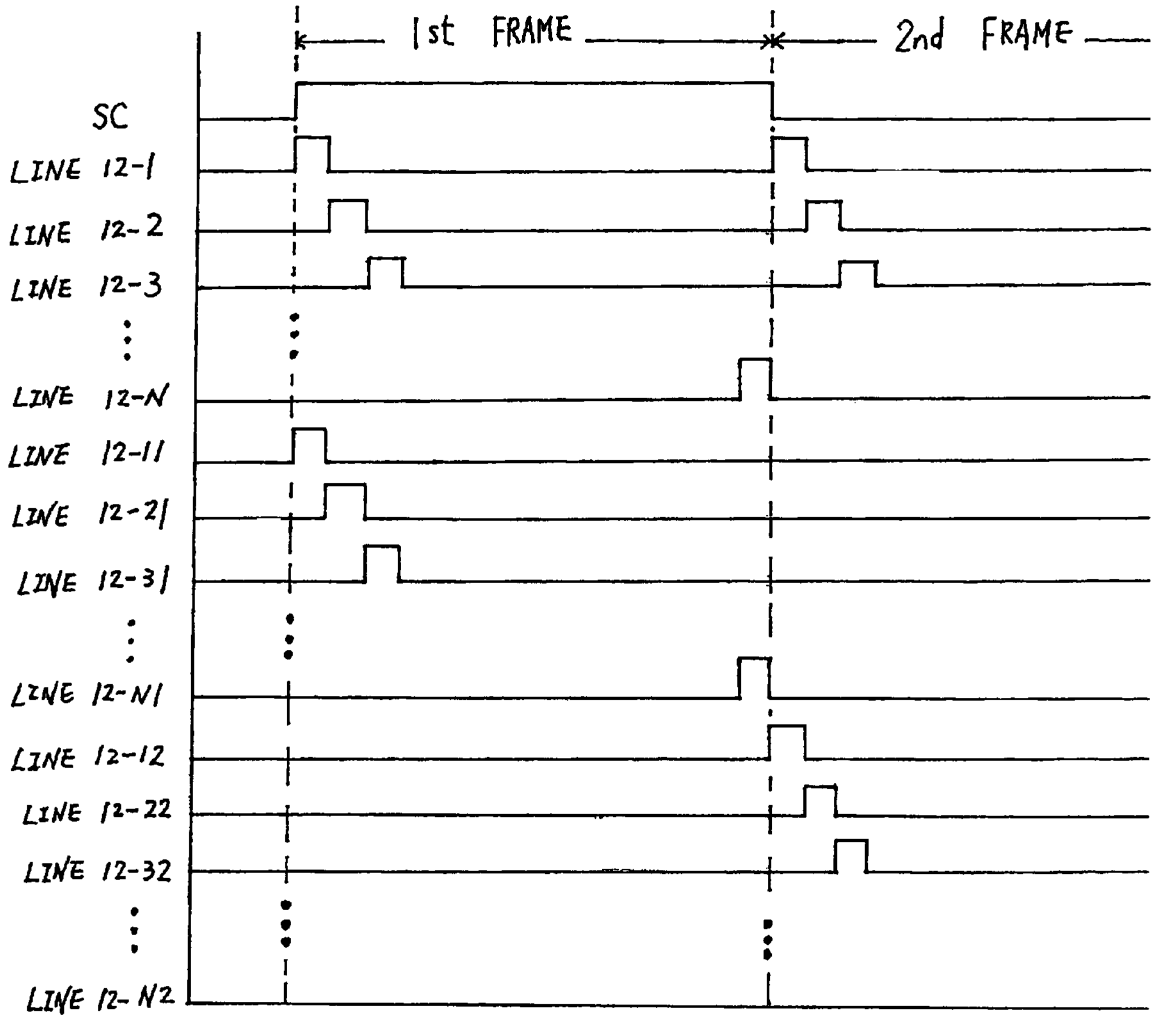
FIG. 3 is a timing specification of a method in accordance with an embodiment of the present invention for driving the FPD device shown in FIG. 1.

FIG. 3 is a timing specification of a method in accordance with an embodiment of the present invention for driving FPD device 10 shown in FIG. 1. The control signal SC, such as a voltage signal, includes a first state and a second state, for example, logically high or logically low, respectively. In an embodiment according to the invention, the control signal is kept at the first state during odd-numbered frames, and kept at the second state during even-numbered frames. A frame refers to a time period in which all of the rows of pixels in the first or second sub-array of pixels are scanned, for example, approximately 1/60 seconds or 16.6 milliseconds.

In response to the first state of the control signal SC, the NMOS transistors of multiplexers 16 are turned on and the PMOS transistors are turned off. A scan signal sequentially provided from scan driver 12 through scan lines 12-1, 12-2 . . . and 12-N, and in turn through connection lines 12-11, 12-21 . . . and 12-NI, selects the first sub-array of pixels 1-1 to 1-M, 3-1 to 3-M, . . . (2N−1)-1 to (2N−1)-M sequentially row by row. A first panel (not shown) of FPD device 10 comprising the first sub-array of pixels to display an image in the first direction. In response to the second state of the control signal SC, the PMOS transistors of multiplexers 16 are turned on and the NMOS transistors are turned off. A scan signal sequentially provided from scan driver 12 through scan lines 12-1, 12-2 . . . and 12-N, and in turn through connection lines 12-12, 12-22 . . . and 12-N2, selects the second sub-array of pixels 2-1 to 2-M, 4-1 to 4-M, . . . (2N)-1 to (2N)-M sequentially row by row. A second panel (not shown) of FPD device 10 comprising the second sub-array of pixels to display an image in the second direction.

Other embodiments of the invention will be apparent to those skilled in the art from consideration of the specification and practice of the invention disclosed herein, It is intended that the specification and examples be considered as exemplary only, with a true scope and spirit of the invention being indicated by the following claims.

What is claimed is:

1. A flat panel display device for dual-panel display, comprising:
- a first sub-array of pixels for image display in a first direction;
- a second sub-array of pixels for image display in a second direction;
- wherein the first sub-array of pixels and the second sub-array of pixels define an array of pixels and share the same data lines;
- at least one scan driver for scanning the array of pixels; and
- a plurality of multiplexers, connectable to receive a control signal having a first state and a second state, for connecting the first sub-array of pixels to the scan driver in response to the first state of the control signal, and connecting the second sub-array of pixels to the scan driver in response to the second state of the control signal.

2. The device of claim 1 wherein the first sub-array of pixels comprises odd-numbered rows of pixels formed in the array.

3. The device of claim 1 wherein the second sub-array of pixels comprises even-numbered rows of pixels formed in the array.

4. The device of claim 1 further comprising a plurality of scan lines coupling the scan driver to the multiplexers.

5. The device of claim 4 wherein two adjacent rows of pixels corresponding to a same scan line are respectively included in the first sub-array and the second sub-array of pixels.

6. The device of claim 1 wherein the multiplexers include a first transistor corresponding to a row of the first sub-array of pixels, and a second transistor corresponding to a row of the second sub-array of pixels.

7. The device of claim 1 wherein the first direction is substantially opposite to the second direction.

8. The device of claim 1 further comprising a first display panel including the first sub-array of pixels and a second display panel including the second sub-array of pixels.

9. A flat panel display device for dual-panel display, comprising:

a first sub-array of pixels for image display in a first direction;

a second sub-array of pixels for image display in a second direction;

wherein the first sub-array of pixels and the second sub-array of pixels define an array of pixels and share the same data lines;

a scan driver coupled to a plurality of scan lines for providing scan signals to the array of pixels; and a plurality of multiplexers, connectable to receive a control signal having a first state and a second state, connecting a row of the first sub-array of pixels to one of the scan lines in response to the first state of the control signal, and connecting a row of the second sub-array of pixels to one of the scan lines in response to the second state of the control signal.

10. The device of claim 9 wherein the first sub-array of pixels comprises odd-numbered rows of pixels formed in the array.

11. The device of claim 9 wherein the second sub-array of pixels comprises even-numbered rows of pixels formed in the array.

12. The device of claim 9 wherein two adjacent rows corresponding to a same pin of the scan driver are respectively included in the first sub-array and the second sub-array of pixels.

13. The device of claim 9 wherein each of the multiplexers comprises a first transistor corresponding to a row of the first sub-array of pixels, and a second transistor corresponding to a row of the second sub-array of pixels.

14. The device of claim 9 wherein the first direction is substantially opposite to the second direction.

15. A method of operating a flat panel display device for dual-panel display, comprising:

forming an array of pixels in rows and columns;

defining a first sub-array of pixels of the array of pixels for image display in a first direction;

defining a second sub-array of pixels of the array of pixels for image display in a second direction;

scanning the array of pixels row by row with at least one scan driver; providing a control signal having a first state and a second state;

connecting the first sub-array of pixels to the at least one scan driver in response to the first state of the control signal; and connecting the second sub-array of pixels to the at least one scan driver in response to the second state of the control signal;

wherein the first and second sub-array of pixels share the same data lines.

16. The method of claim 15 further comprising maintaining the control signal at the first state during odd-numbered frames.

17. The method of claim 15 further comprising maintaining the control signal at the second state during even-numbered frames.

18. The method of claim 15 further comprising providing a plurality of multiplexers for connecting the first sub-array and the second sub-array of pixels to the at least one scan driver in response to the control signal.

19. The method of claim 18 wherein each of the plurality of multiplexers comprises a first transistor corresponding to a row of the first sub-array of pixels, and a second transistor corresponding to a row of the second sub-array of pixels, the method further comprising turning on the first transistor in response to the first state of the control signal and turning on the second transistor in response to the second state of the control signal.

20. The method of claim 15 further comprising providing a first display panel with the first sub-array of pixels, and a second display panel with the second sub-array of pixels.

21. A flat panel display device for dual-panel display comprising:

a plurality of first pixels arranged in matrix for image display in a first direction;

a plurality of second pixels arranged in matrix for image display in a second direction;

at least one scan driver for scanning the first pixels and the second pixels;

a plurality of multiplexers, connectable to receive a control signal having a first state and a second state, for connecting the first row of the first pixels in response to the first state of the control signal, and connecting the first row of the second pixels to the scan driver in response to the second state of the control signal; and wherein the first row of the first pixels and the first row of the second pixels are different rows.

22. The device of claim 21 wherein the first pixels are arranged in odd-numbered rows of pixels of the device.

23. The device of claim 21 wherein the second pixels are arranged in even-numbered rows of pixels of the device.

24. The device of claim 21 further comprising a plurality of scan lines coupling the scan driver to the multiplexers.

25. The device of claim 24 wherein two adjacent rows of pixels corresponding to a same scan line are respectively included in the first and second pixels.

26. The device of claim 21 wherein the multiplexers include a first transistor corresponding to a row of the first pixels, and a second transistor corresponding to a row of the second pixels.

27. The device of claim 21 wherein the first direction is substantially opposite to the second direction.

28. The device of claim 21 further comprising a first display panel including the first pixels and a second display panel including the second pixels.

* * * * *